United States Patent [19]
Jansson

[11] Patent Number: 6,146,062
[45] Date of Patent: Nov. 14, 2000

[54] TOOL AND CLAMP FOR CHIP REMOVING MACHINING

[75] Inventor: Mikael Jansson, Avesta, Sweden

[73] Assignee: Seco Tools AB, Fagersta, Sweden

[21] Appl. No.: 09/320,464

[22] Filed: May 27, 1999

[30] Foreign Application Priority Data

May 29, 1998 [SE] Sweden .................................. 9801903

[51] Int. Cl.$^7$ ............................... B23B 27/16; B26D 1/00
[52] U.S. Cl. ......................... 407/107; 407/109; 407/111; 407/112
[58] Field of Search ................................ 407/107, 108, 407/109, 111, 112, 98, 102

[56] References Cited

U.S. PATENT DOCUMENTS

| | | |
|---|---|---|
| 3,325,877 | 6/1967 | Jonsson . |
| 3,731,356 | 5/1973 | Gowanlock . |
| 3,837,058 | 9/1974 | Barkley et al. ..................... 407/109 X |
| 4,477,212 | 10/1984 | Kraft .................................. 407/112 X |
| 4,480,950 | 11/1984 | Kraft et al. . |
| 5,100,268 | 3/1992 | Nakayama et al. . |
| 5,944,457 | 8/1999 | Tjernstrom ........................ 407/107 X |
| 5,996,655 | 12/1999 | Cramond et al. .................. 407/111 X |

FOREIGN PATENT DOCUMENTS

| | | |
|---|---|---|
| 0 143 569 | 6/1985 | European Pat. Off. . |
| 2 248 107 | 5/1975 | France . |
| 25 10 960 | 9/1976 | Germany . |
| 1269917 | 11/1986 | U.S.S.R. ............................... 407/107 |
| 2 067 934 | 8/1991 | United Kingdom . |

*Primary Examiner*—Henry W. H. Tsai
*Attorney, Agent, or Firm*—Burns, Doane, Swecker & Mathis, L.L.P.

[57] ABSTRACT

A tool for chip removing metal machining includes a holder, a solid cutting insert mounted in a pocket of the holder, and a clamp for securing the insert. The clamp includes a clamping surface frictionally engaging a planar upper surface portion of the insert. The clamp is attached to the holder by a screw causing a downward projection of the clamp to slide along a sloping surface of the holder in order to displace the clamp and the insert rearwardly until the insert abuts an upstanding support surface of the holder. As the clamp is being tightened-down by the screw, an elastic lip of the clamp is elastically deformed by a surface of the holder to tilt the clamp in a direction causing the clamping surface to bear more firmly against the insert. A stop arrangement terminates the tightening down of the clamp before the clamp is plastically deformed.

9 Claims, 4 Drawing Sheets

TOOL AND CLAMP FOR CHIP REMOVING MACHINING

BACKGROUND OF THE INVENTION

The present invention relates to a tool for chip removing machining, and especially to an apparatus and method for clamping a cutting insert in place.

PRIOR ART

Through U.S. Pat. No. 4,480,950 or U.S. Pat. No. 5,100,268, a tool of above type is previously known. The known tool comprises a clamp by which a cutting insert is clamped against a cutting insert pocket in a holder. The forward end of the clamp includes a projection which cooperates with a recess in the cutting insert such that the cutting insert is pushed both downwards and inwards at tightening of a screw which acts on the mid section of the clamp. The rear end of the clamp comprises an oblique surface that cooperates with an oblique surface on the holder. The clamp is moved during said tightening. A drawback of the known tool is that the cutting insert must include said recess such that the clamp can function satisfactorily. Another drawback is that plastic deformation of the clamp can occur. Furthermore, solid (non-recessed, non-apertured) cutting inserts with planar surfaces cannot be satisfactorily held by means of the known device.

OBJECTS OF THE INVENTION

One object of the present invention is to provide a tool and an insert-clamping apparatus and method which comprises the advantages common with prior art.

Another object of the present invention is to provide a tool, which comprises a carefully defined stop for a clamp in order to avoid plastic deformation of the clamp.

Another object of the present invention is to provide a tool, which comprises a clamp with a longer useful engagement than previous tools.

Still another object of the present invention is to provide a tool in which a planar cutting insert can be rigidly clamped.

Still another object of the present invention is to provide a clamp in order to attain the above-captioned advantages.

SUMMARY OF THE INVENTION

These and other objects have been achieved by a tool for chip removing machining. The tool comprises a holder which includes an insert pocket having a bottom surface and at least one upstanding support surface, and a sloping surface spaced from the pocket and sloping downwardly in a rearward direction away from the pocket. A solid cutting insert is seated in the pocket, the insert including an upper side, at least a portion of which is planar. A clamp is mounted on the holder and includes a body having a front clamping surface frictionally engaging the planar portion of the upper side of the insert, and a downward projection. The downward projection includes a slide surface disposed in sliding contact with the sloping surface. A tightener, such as a screw, is provided for tightening the clamp against the holder and the insert, whereby the slide surface slides along the sloping surface for displacing the clamp in the rearward direction to frictionally pull the cutting insert rearwardly into contact with the at least one support surface. The clamping surface is rearwardly slidable relative to the planar portion during additional tightener-induced displacement of the clamp following the contact between the insert and the at least one support surface. The clamp body includes an elastically deformable portion spaced from the downward projection and arranged to contact the holder and be elastically deformed thereby as the clamp is tightened against the holder and to tilt the clamp in a direction causing the clamping surface to press more firmly against the cutting insert. The clamp body and the holder together form a stop arrangement for terminating the additional displacement.

The invention also relates to the clamp per se.

The invention also pertains to a method of clamping a cutting insert in a holder comprising the steps of:

A) seating the insert in a pocket of the holder;

B) positioning a clamp body such that a front clamping surface of the clamp body engages an upper surface of the insert, and a rear slide surface of the clamp body abuts a downwardly/rearwardly sloping surface of the holder;

C) tightening-down the clamp body, whereby the clamping surface bears frictionally against the upper surface of the insert, and the sliding surface slides along the sloping surface to cause the clamp body to frictionally pull the insert rearwardly into contact with an upstanding supporting surface structure of the holder, and whereby an elastically deformable portion of the clamp body contacts the holder and is elastically deformed thereby to tilt the clamp in a direction causing the clamping surface to press more firmly against the insert;

D) continuing to tighten-down the clamp body following the contact between the insert and the supporting surface structure whereby the clamping surface undergoes an additional sliding displacement relative to the upper surface of the insert; and E) causing portions of the clamp body and the holder to engage one another to define a stop terminating the additional displacement of the clamp body.

DETAILED DESCRIPTION OF PREFERRED EMBODIMENTS OF THE INVENTION

Figure 1:
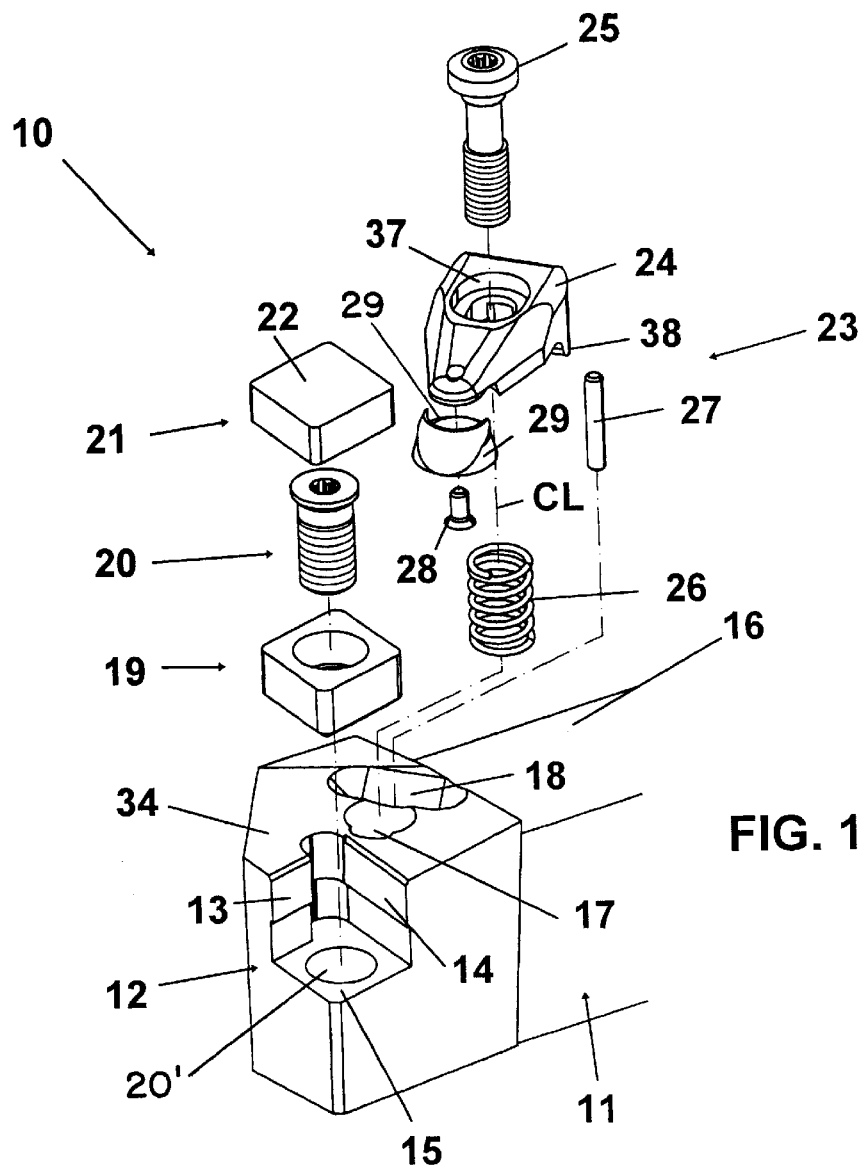
FIG. 1 shows an exploded view of a tool according to the present invention in a perspective view.
Figure 2A:
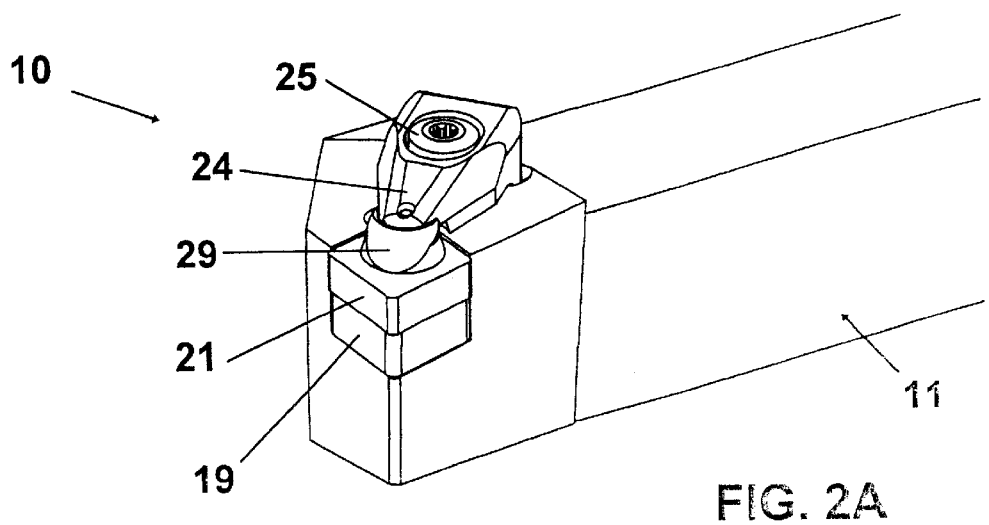
FIG. 2A shows the tool in an assembled condition in a perspective view.

The tool 10, FIG. 1, comprises a cutting insert holder 11 intended for turning, which in its forward end ends in a taper, wherein there is provided a cutting insert pocket 12 with two support surfaces 13, 14 angled relative to each other, as well as a bottom surface 15. The bottom surface contains a threaded hole 20'. The holder has a shank 16. A first recess 17 is provided between the cutting insert pocket 12 and the shank. The recess 17 connects to a second recess or slot 18 provided closer to the shank in direction F (see FIG. 2B). The tool 10 further comprises a shim 19 provided to be forced against the bottom surface by a fastening screw 20 that is threadably received in the hole 20'. Furthermore, a cutting insert 21 is intended to abut against the shim 19 and against the support surfaces 13, 14. The cutting insert 21 has a polygonal basic shape with substantially planar and parallel side faces 22. In some cases only the central portions of the cutting insert may be planar and parallel while the chip surface and adjacent surfaces are profiled. The cutting insert pocket may alternatively be provided for round, triangular or rhombic cutting inserts or trigon inserts (ISO W inserts).

In order to firmly clamp the cutting insert 21 in the cutting insert pocket 12, a clamping device 23 is provided which consists of a lever of a clamp 24, a clamp-tightening screw 25, a spring 26, a positioning pin 27, a hollow pin 28 and a pressure cup 29. The pin 27 is for the sake of clarity not shown in FIGS. 3C–4C.

Figure 3A:
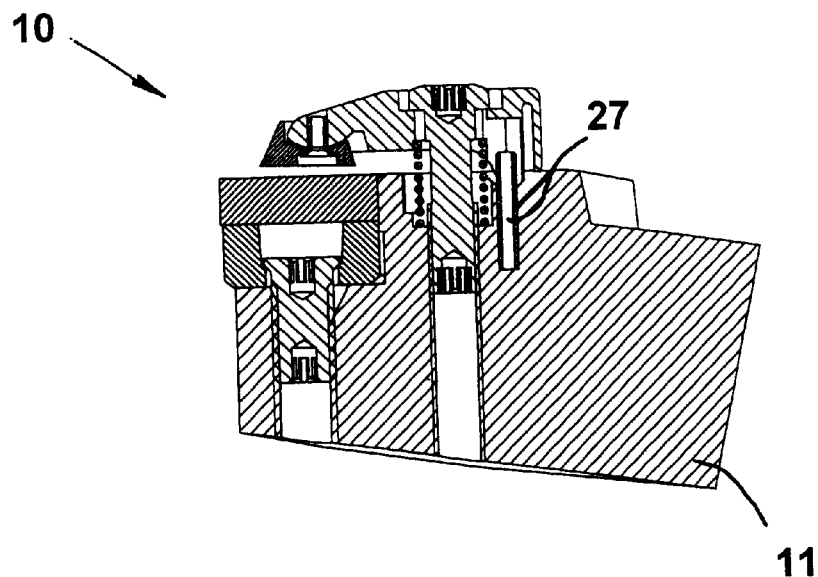
FIG. 3A shows a first step in a mounting sequence of the tool according to the line III—III in FIG. 2B.
Figure 3B:
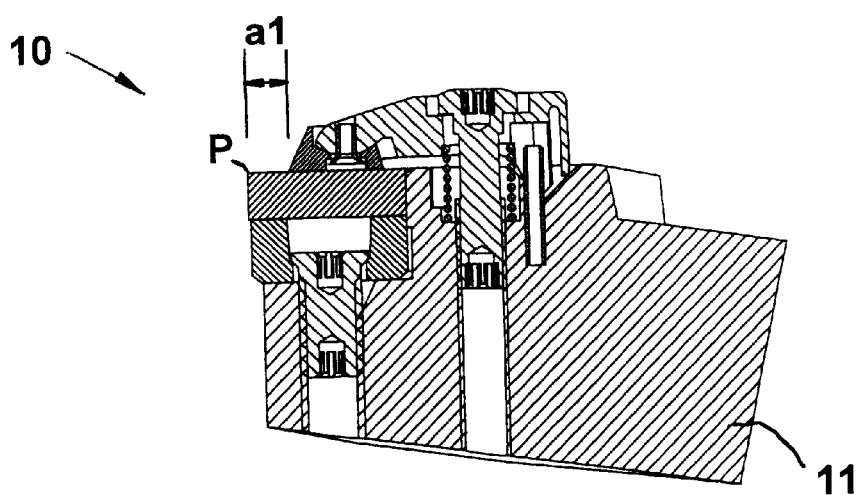
FIG. 3B is a view similar to FIG. 3A showing a second step in the mounting sequence.
Figure 3C:
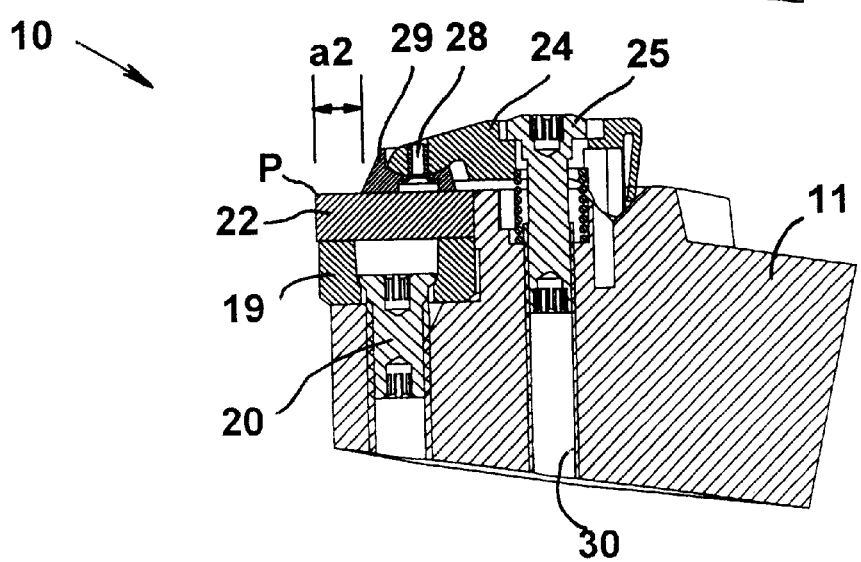
FIG. 3C is a view similar to FIG. 3A showing a third step in the mounting sequence.
Figure 4A:
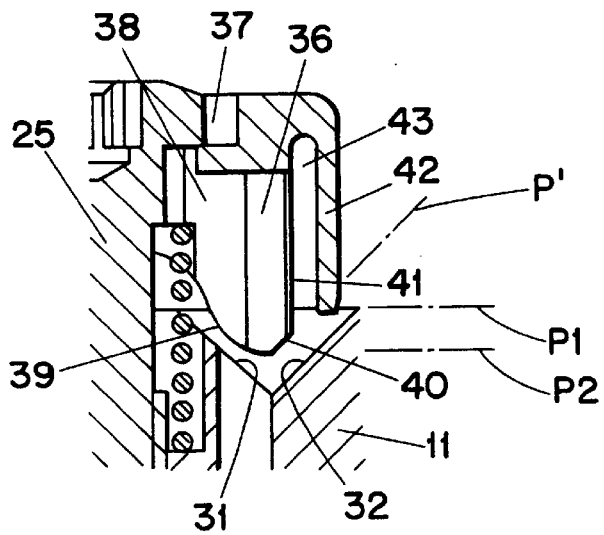
FIG. 4A is an enlargement of a fragment of FIG. 3A.
Figure 4B:
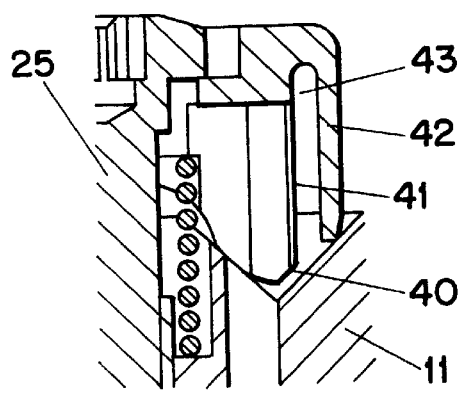
FIG. 4B is an enlargement of a fragment of FIG. 3B.

The clamp 24, FIGS. 3A–3C, has a body substantially in the shape of an elongated wedge, wherein the clamp body defines a longitudinal axis 33 and a relatively central hole 37. The clamp is maneuverable by means of the screw 25 threaded into a boring or through-hole 30 of the cutting insert holder 11. The center axis CL of the boring 30 is parallel to the threaded hole 20' in the cutting insert pocket. The clamp has a forward end with an essentially part-spherical surface intended to abut against a complementary surface of an upwardly opening recess 29a formed in the pressure cup 29. The pressure cup is retained on the clamp by the hollow pin 28, which cooperates with holes in both the cup and the clamp. The pressure cup is retained on the clamp in such a manner that the pressure cup is admitted a certain mobility around the radius center of the part-spherical surface. The lower side of the pressure cup is substantially planar.

Figure 5:
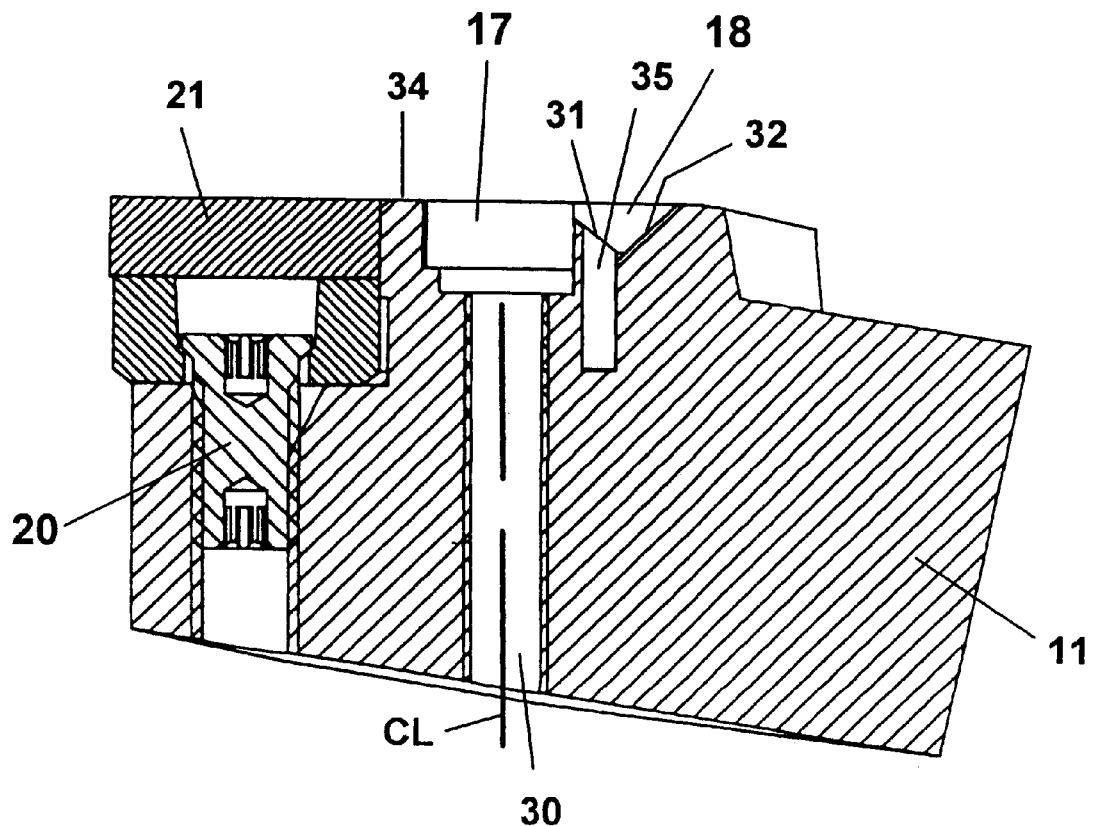
FIG. 5 is a cross-sectional view of the holder minus the clamp according to the line III—III in FIG. 2B.
Figure 2B:
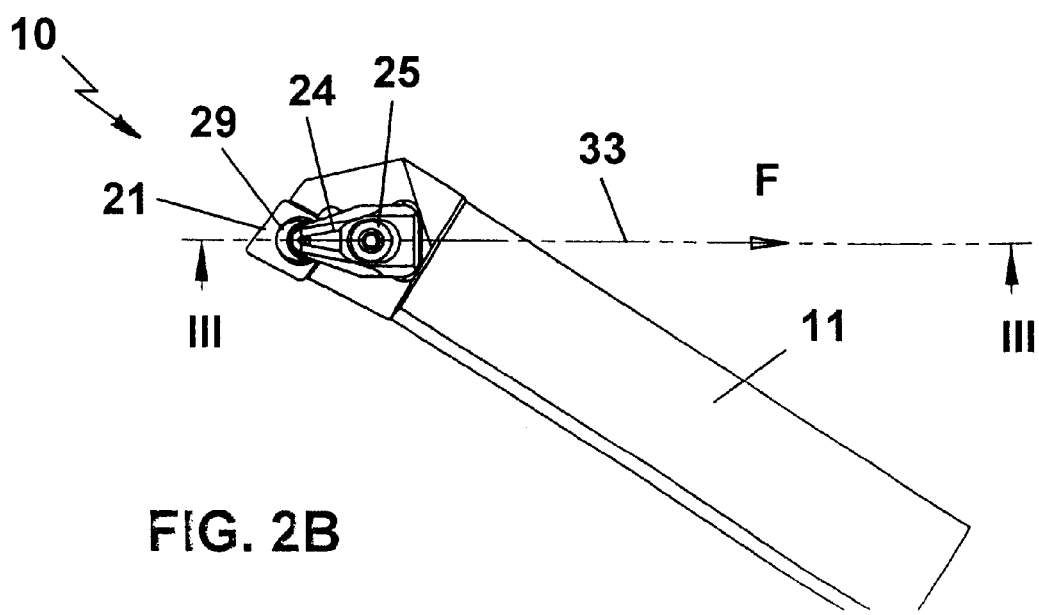
FIG. 2B shows the tool in an assembled condition in plan view.

The second recess 18 of the holder, FIG. 5, comprises two substantially perpendicular first and second surfaces 31 and 32, respectively, that are downwardly inclined toward each other. The first surface 31 can be called a sloping surface while the second surface 32 can be called a stop surface. Said surfaces 31, 32 are provided substantially perpendicular to the longitudinal axis 33 of the clamp as viewed from above (FIG. 2B). The sloping surface 31 forms an angle about 30–60° with an upper side 34 of the holder. A boring 35 terminates substantially in the middle of the sloping surface relative to the lateral direction of the clamp. The boring 35 is intended to receive the positioning pin 27, which in turn is intended to be fitted, with a gap, into a recess 36 in the clamp. The pin 27 is intended to guide the clamp via the recess 36 during the mounting sequence. Alternatively, the pin 27 could be integrated with the clamp, whereby the pin during clamping is provided to run in a groove in the surface 31.

The second or rear end of the clamp facing away from the pressure cup comprises a projection 38. The free end of the projection 38 faces towards the holder and comprises first and second surfaces 39 and 40, respectively, sloping downwardly towards each other, FIG. 4C. The first surface 39 may be called a slide surface while the second surface 40 can be called an abutment surface. Said surfaces 39, 40 extend substantially perpendicularly to the longitudinal axis 33 of the clamp as viewed from above. The slide surface 39 is convex and the abutment surface 40 forms an angle of about 45° with an upper side 34 of the holder. Projecting downwardly from the clamp body at a location spaced rearwardly from a rear surface 41 of the projection 38 is a lip 42. The lip is preferably integral with the clamp by having a slot 43 machined out of the basic material of the clamp. The projection 38 extends downwardly farther than the lip 42. That is, a plane P2 oriented perpendicular to the center line CL and containing a lowermost portion of the projection 38, is situated below a plane P1 oriented perpendicular to the center line CL and containing a lowermost portion of the lip 42. The lip can alternatively be attached to the clamp in other manners. The lip 42 extends past a plane P' that is defined by the abutment surface 40 of the projection (see FIG. 4A), or by a tangent thereto in case the second surface 42 is convexly curved. That is, the second surface 40 can be flat and thereby coincide with the plane P', or the second surface 40 can be convexly curved, whereby the plane P' is defined by a tangent to the surface 40. The slot 43 shall most preferably not be entirely closed during the mounting procedure, although it could be in an alternate embodiment disclosed in connection with FIG. 6.

The clamping device 23 functions as follows, FIGS. 3A–4C. The positioning pin 27, which preferably is slotted, is firmly pressed into the boring 35, and the spring 26 is put in an enlargement of the boring 30. Once the pressure cup 29 has been mounted, with the aid of the hollow pin 28, to the end of the clamp in accordance with the above-mentioned procedure, the threaded part of the locking screw 25 is brought through the hole 37 in the clamp and subsequently through the spring and is threaded into the boring 30, see FIGS. 3A and 4A. In this situation the clamp lacks direct contact with both the cutting insert and the holder. This position substantially constitutes a correct position for exchanging or indexing of a cutting insert. The head of the locking screw is the only part of the screw intended to remain in contact with the clamp during the mounting procedure, when the lower side of the head may slide on a shoulder in the recess 37. The spring is provided to lift the clamp during loosening of the screw.

A cutting insert 21 is inserted in the cutting insert pocket 12. The upper side 22 of the insert has a planar portion at least at its center region. Then, further tightening of the screw 25 forces the clamp in a direction towards the holder and the cutting insert such that: (i) the planar lower side of the pressure cup engages the solid planar portion of the upper side 22 of the cutting insert, (ii) the slide surface 39 of the projection 38 engages the inwardly and rearwardly inclined sloping surface 31 of the recess 18, and (iii) the abutment surface 40 of the lip 42 engages the forwardly inclined stop surface 32. By "solid" cutting insert is here meant a cutting insert without any through-going central hole, or recess, for pin or screw attachment. The extreme or forwardmost part of the pressure cup is then provided at the distance a1 from the extreme or forwardmost point P of the cutting insert in the cross-section according to FIG. 3B.

Figure 4C:
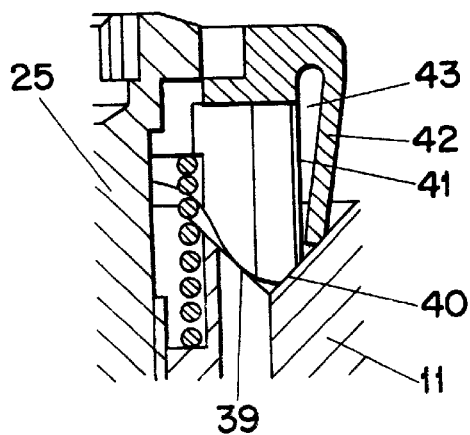
FIG. 4C is an enlargement of a fragment of FIG. 3C.

During still further tightening of the screw 25 the clamp is forced farther in a downward direction towards the holder as well as somewhat rearwardly in direction F due to cooperation between the surfaces 31 and 39. Simultaneously, the lip 42 yieldably opposes or counteracts this direction F motion, and therefor the clamp tilts about the screw (counterclockwise in FIG. 3C) such that a substantial pressure arises between the pressure cup and the cutting insert even before the projection 38 bottoms-out in the recess 18. (Such bottoming-out occurs when the surface 40 abuts against the surface 32 as shown in FIG. 4C, whereby the projection 38 and the stop surface 32 define a stop arrangement). This means that friction between the pressure cup and the cutting insert becomes great such that the cutting insert is forced in direction F, together with the movement of the clamp, inwards towards the support surfaces 13, 14. The extreme part of the pressure cup (FIG. 3C) is then provided at the distance a2 from the extreme point P of the cutting insert in the cross section according to FIG. 3B. The distance a2 is greater than the distance a1.

Subsequently after additional displacement of the clamp, the projection 38 bottoms-out such as is shown in FIGS. 3C and 4C by having the abutment surface 40 of the projection 38 abutting against the stop surface 32 of the recess 18. The operator notes this as a sudden increase in the resistance against tightening of the screw 25, and thus terminates the tightening, which obviates plastic deformation of the clamp and the screw. Since the projection 38 forms an essentially V-shaped place of contact with the recess 18, the clamp becomes rigidly fixed in the position according to FIG. 3C.

Figure 6:
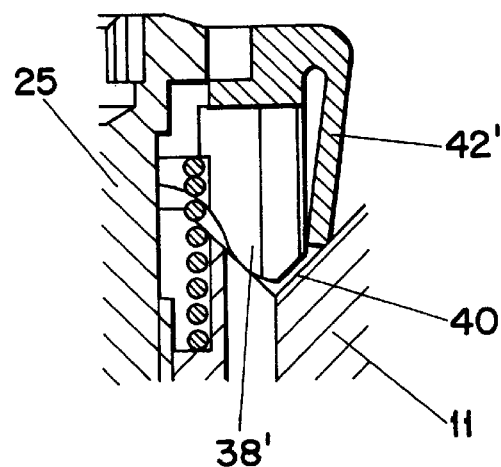
FIG. 6 is a view similar to FIG. 4C of an alternative embodiment.

In an alternative embodiment, shown in FIG. 6, the lip 42' could be deformed forwardly to such an extent that it engages the downward projection 38' (which is shorter than the projection 38), thus terminating the displacement of the clamp. Thus, in this embodiment, the stop arrangement is defined by the lip 42, the stop surface 32, and the downward projection 38.

In order to index the cutting insert, the screw is untightened somewhat such that the cutting insert is pushed forwardly by the force of reaction from the lip 42 shortly before the pressure cup disengages from the upper side of the cutting insert. The cutting insert thereby becomes easy to index.

The present invention consequently relates to a tool and a clamp with a movement stop and a with greater useful engagement than was earlier possible, whereby planar e.g., preferably solid, cutting inserts may be rigidly clamped foremost by engaging the clamp frictionally at an early stage during the mounting procedure with the cutting insert in comparison with prior art devices.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool for chip removing machining, comprising:
   a holder including:
      an insert pocket having a bottom surface and at least one upstanding support surface, and
      a sloping surface spaced from the pocket and sloping downwardly in a rearward direction away from the pocket,
   a cutting insert seated in the pocket, the insert including an upper side at least a portion of which is planar;
   a clamp device mounted on the holder and including a front clamping surface frictionally engaging the planar portion of the upper side of the insert, and a downward projection, the downward projection including a slide surface disposed in sliding contact with the sloping surface;
   a tightener for tightening the clamp device against the holder and the insert, whereby the slide surface slides along the sloping surface for displacing the clamp in the rearward direction to frictionally pull the cutting insert rearwardly into contact with the at least one support surface;
   the clamping surface being rearwardly slidable relative to the planar portion during additional tightener-induced displacement of the clamp device following the contact between the insert and the at least one support surface;
   the clamp device including an elastically deformable portion spaced from the downward projection and arranged to contact the holder and be elastically deformed thereby as the clamp device is tightened against the holder and to tilt the clamp in a direction causing the clamping surface to press more firmly against the cutting insert;
   the clamp device and the holder together forming a stop arrangement for terminating the additional displacement.

2. The tool according to claim 1 wherein the elastically deformable portion comprises a downwardly depending lip spaced rearwardly from the downward projection, the holder further including a stop surface sloping downwardly in a forward direction toward the pocket, the lip arranged to slide along, and be elastically deformed by, the stop surface as the clamp device is tightened against the holder.

3. The tool according to claim 2 wherein the downward projection includes a bottom surface arranged to engage the stop surface, whereby the stop arrangement is formed by the downward projection and the stop surface.

4. The tool according to claim 3 wherein the lip projects downwardly past a plane defined by the bottom surface.

5. The tool according to claim 2 wherein the lip is arranged to be deformed sufficiently to contact the downward projection, whereby the stop arrangement is formed by the lip, the stop surface, and the downward projection.

6. The tool according to claim 1 wherein the clamp tightener comprises a screw passing through the clamp device and threadedly inserted into the holder.

7. The tool according to claim 1 further including a spring biasing the clamp device upwardly away from the holder.

8. A clamp adapted for clamping a cutting insert in a holder, the clamp device comprising a clamp having a through-hole extending therethrough in a downward direction, and a pressure cup disposed at a front end of the clamp, the pressure cup having a front clamping surface facing in a direction defining a downward direction, a projection projecting downwardly from the clamp at a location spaced from the clamping surface in a direction defining a rearward direction, and a lip projecting downwardly from the clamp at a location spaced from the projection in the rearward direction, a lowermost position of the lip lying in a first plane oriented perpendicular to a center line of the through-hole, and a lowermost portion of the projection lying in a second plane oriented perpendicular to the center line, the second plane disposed below the first plane, the projection including a bottom surface, the pressure cup including an upwardly opening recess into which the front end of the clamp projects.

9. A method of clamping a cutting insert in a holder comprising the steps of:
   A) seating the insert in a pocket of the holder;
   B) positioning a clamp device such that a front clamping surface of the clamp device engages a planar portion of an upper surface of the insert, and a rear slide surface of the clamp device abuts a downwardly and rearwardly sloping surface of the holder;
   C) tightening-down the clamp device, whereby the clamping surface bears frictionally against the planar portion of the insert and the sliding surface slides along the sloping surface to cause the clamp device to frictionally pull the insert rearwardly into contact with an upstanding supporting surface structure of the holder, and whereby an elastically deformable portion of the clamp device contacts the holder and is elastically deformed thereby to tilt the clamp device in a direction causing the clamping surface to press more firmly against the insert;

D) continuing to tighten-down the clamp device following the contact between the insert and the supporting surface structure whereby the clamping surface undergoes an additional sliding displacement relative to the upper surface of the insert; and E) causing portions of the clamp device and the holder to engage one another to define a stop terminating the additional displacement of the clamp device.

* * * * *